United States Patent [19]
Gould et al.

[11] Patent Number: 5,359,594
[45] Date of Patent: Oct. 25, 1994

[54] POWER-SAVING FULL DUPLEX NODAL COMMUNICATIONS SYSTEMS

[75] Inventors: Joel M. Gould, Winchester; Neal M. Lackritz, Burlington, both of Mass.

[73] Assignee: International Business Machines Corporation, Armonk, N.Y.

[21] Appl. No.: 884,538

[22] Filed: May 15, 1992

[51] Int. Cl.⁵ .................................. H04J 3/02
[52] U.S. Cl. ...................... 370/24; 370/100.1; 370/13; 455/343
[58] Field of Search ............... 370/32.1, 24, 29, 100.1, 370/49, 17, 13, 16, 103; 340/825.2, 825.14, 825.21, 870.39; 455/88, 116, 343, 70

[56] References Cited

U.S. PATENT DOCUMENTS

| | | | |
|---|---|---|---|
| 4,259,594 | 3/1981 | Fox et al. | 307/141 |
| 4,435,761 | 3/1984 | Kimoto | 364/200 |
| 4,484,028 | 11/1984 | Kelley et al. | 179/2 DP |
| 4,484,030 | 11/1984 | Gavrilovich | 340/825.16 |
| 4,498,082 | 2/1985 | Aldridge et al. | 340/825.16 |
| 4,569,042 | 2/1986 | Larson | 370/13 |
| 4,592,051 | 5/1986 | Frizlen | 370/103 |
| 4,654,656 | 3/1987 | Deaver et al. | 340/825.08 |
| 4,656,318 | 4/1987 | Noyes | 379/93 |
| 4,663,539 | 5/1987 | Sharp et al. | 307/38 |
| 4,754,273 | 6/1988 | Okada et al. | 340/825.2 |
| 4,794,649 | 12/1988 | Fujiwara | 455/70 |
| 4,812,839 | 3/1989 | Okada et al. | 340/825.14 |
| 4,897,831 | 1/1990 | Negi et al. | 370/29 |
| 4,970,506 | 11/1990 | Sakaida et al. | 340/825.140 |
| 5,161,151 | 11/1992 | Kimura et al. | 370/13 |
| 5,222,245 | 6/1993 | Ando et al. | 455/343 |

Primary Examiner—Douglas W. Olms
Assistant Examiner—Chau T. Nguyen
Attorney, Agent, or Firm—Perman & Green

[57] ABSTRACT

An inter-nodal communication system employs full duplex transmission links to connect asynchronously operating nodes. Links between nodes are quiesced to a no-current flow state in the absence of message traffic. The system employs a communication protocol that incorporates time-outs which (1) enable a broken link to be detected at the inception of a message and (2) prevent a receiver from listening to a link which has been quiesced by a transmitter at the other end of a link that is shutting-off. All synchronization messages in the inter-nodal communication network are carried by data links and no additional communication wires are required.

12 Claims, 12 Drawing Sheets

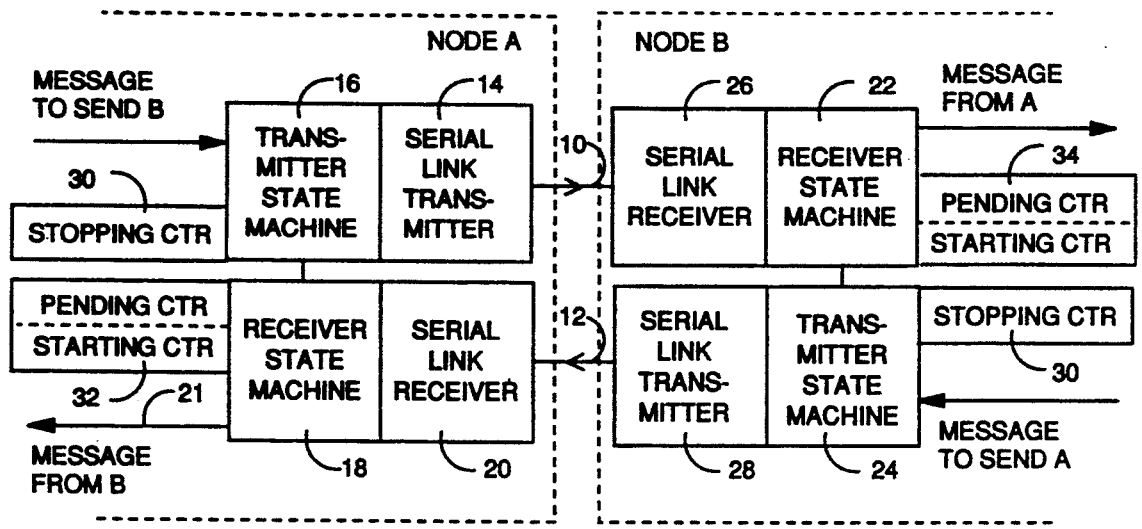

FIG. 1

TRANSMITTER STATES

|  | QUIET | IDLE | STOPPING | RUNNING |
|---|---|---|---|---|
| START OF MESSAGE | E, F > RUNNING | F > RUNNING | F > RUNNING |  |
| END OF MESSAGE |  |  |  | F > IDLE |
| PARTNER RUNNING | E, F > IDLE |  | F > IDLE |  |
| PARTNER NOT RUNNING |  | B > STOPPING |  |  |
| PARTNER ERROR |  |  |  | F > IDLE |
| TIMEOUT |  |  | D > QUIET |  |
| OTHERWISE | > QUIET | B > IDLE | B > STOPPING | S > RUNNING |

> = SWITCH TO ANOTHER STATE
E = ENABLE LINK
D = DISABLE LINK
F = SEND FCLOSE
B = SEND BLANK
S = SEND BYTE OF MESSAGE

FIG. 2

RECEIVER STATE TABLE

RECEIVER STATES

|  | QUIET | STARTING | PENDING | IDLE | RUNNING |
|---|---|---|---|---|---|
| FCLOSE W/ PARTNER RUNNING | > IDLE | > IDLE | R |  | > IDLE |
| FCLOSE W/ PARTNER NOT RUNNING | > PENDING | > IDLE | R |  | > IDLE |
| START OF MESSAGE |  |  | > RUNNING | > RUNNING |  |
| PARTNER RUNNING | >STARTING |  | > IDLE |  |  |
| PARTNER NOT RUNNING |  | > QUIET |  | > PENDING |  |
| TIMEOUT |  | E,R | > QUIET |  |  |
| OTHERWISE | > QUIET | > STARTING | > PENDING | > IDLE | M >RUNNING |

> = SWITCH TO ANOTHER STATE
E = SIGNAL ERROR TO PARTNER
R = RESET TIMEOUT COUNTER
M = READ BYTE OF MESSAGE

FIG. 3

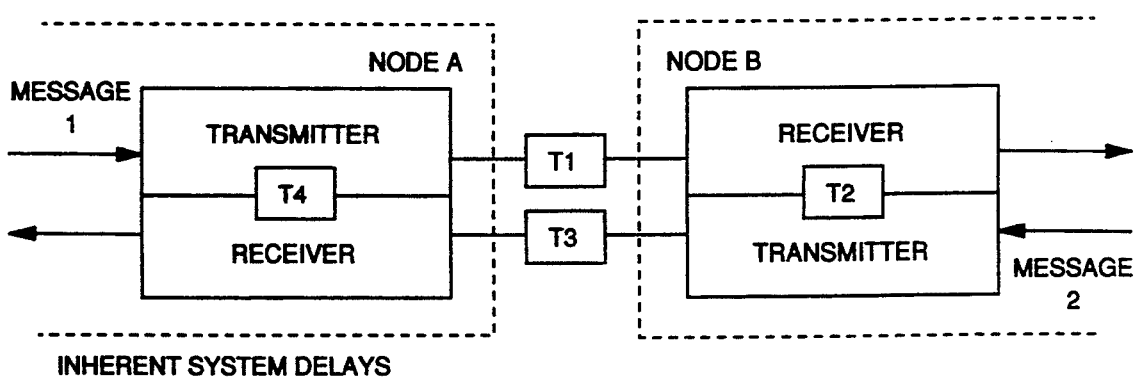

FIG. 4

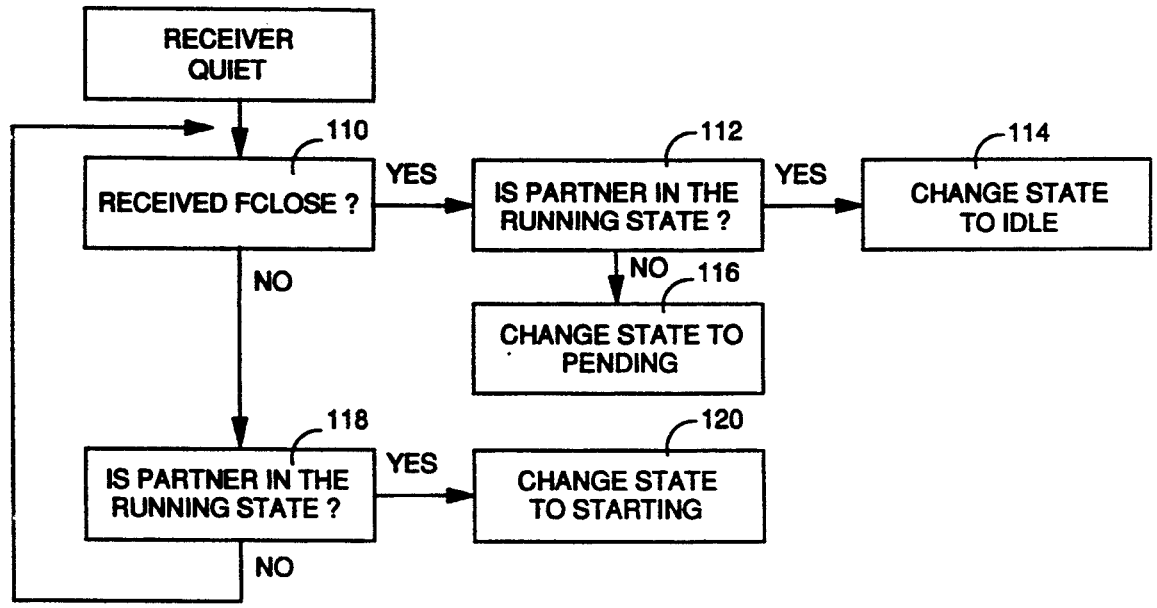
RECEIVER QUIET STATE  FIG. 9
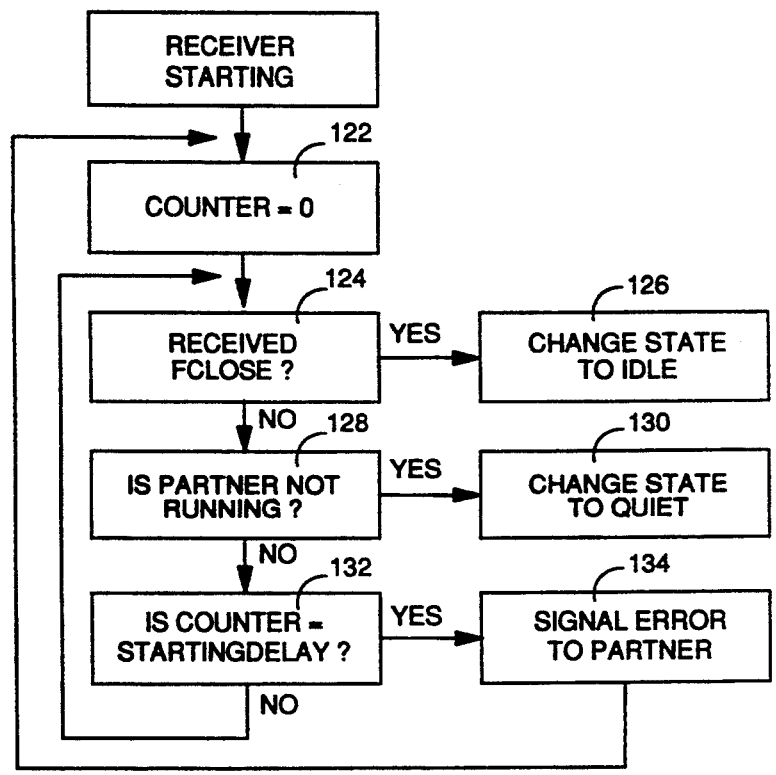
RECEIVER STARTING STATE  FIG. 10

RECEIVER PENDING STATE

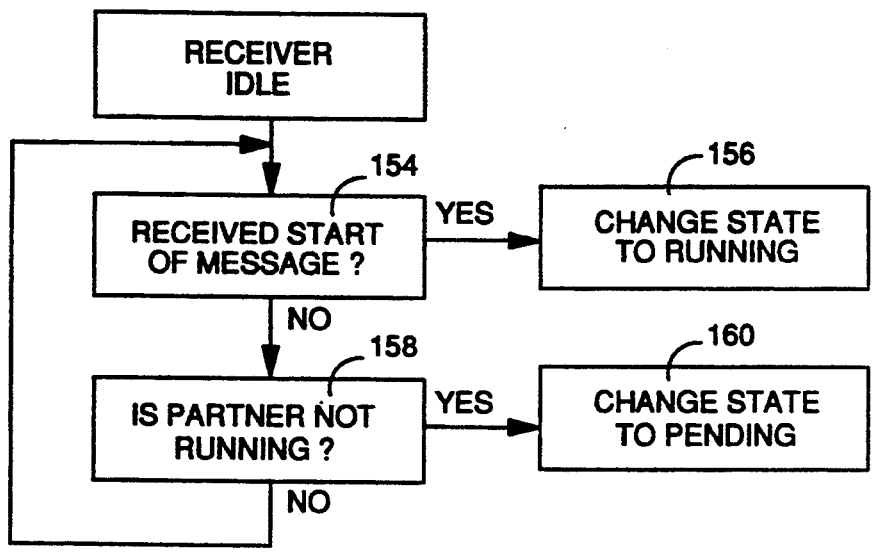
RECEIVER IDLE STATE     FIG. 12
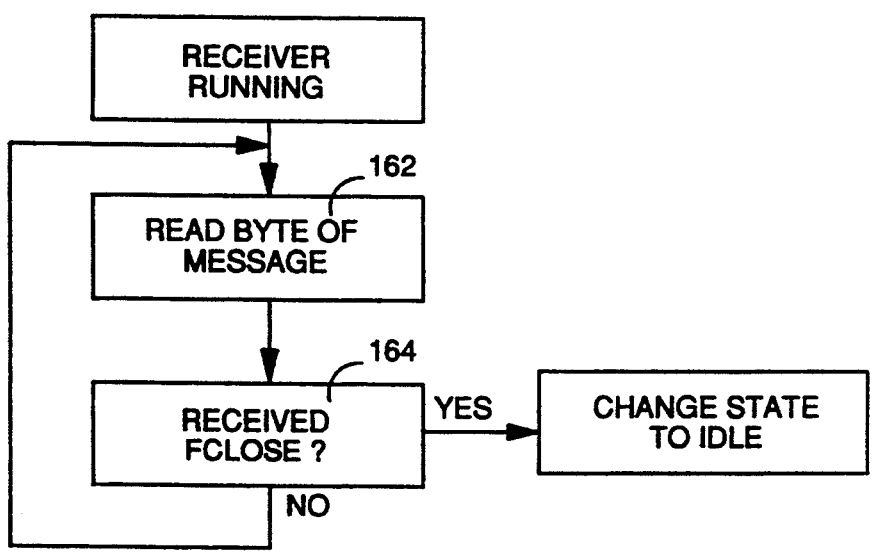
RECEIVER RUNNING STATE     FIG. 13

EXAMPLE 1: - START WITH COMPLETELY QUIESCED SYSTEM
T1 = QUIET STATE
R1 = QUIET STATE
T2 = QUIET STATE
R2 = QUIET STATE
- MESSAGE BEGINS THROUGH T1
- SYSTEM THEN QUIESCES AGAIN
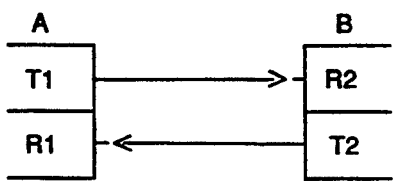
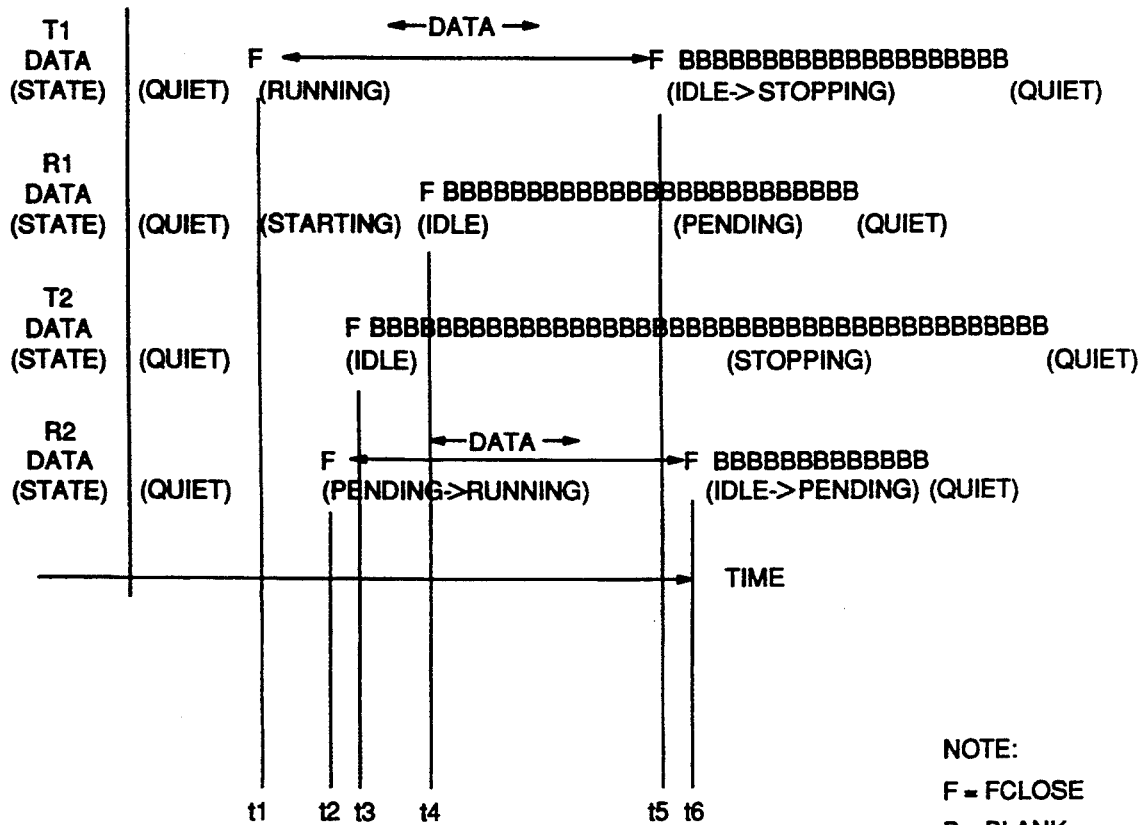
FIG. 14

EXAMPLE 2: - START WITH COMPLETELY QUIESCED SYSTEM
T1 = QUIET STATE
R1 = QUIET STATE
T2 = QUIET STATE
R2 = QUIET STATE

- MESSAGE BEGINS THROUGH T1
- JUST A BIT LATER, SHORT MESSAGE BEGINS THROUGH T2
- SYSTEM THEN QUIESCES AGAIN

EXAMPLE 3: - START WITH COMPLETELY QUIESCED SYSTEM
T1 = QUIET STATE
R1 = QUIET STATE
T2 = QUIET STATE
R2 = QUIET STATE
- MESSAGE BEGINS THROUGH T1
- WIRE BETWEEN T1 AND R2 BROKEN
- SYSTEM THEN QUIESCES AGAIN
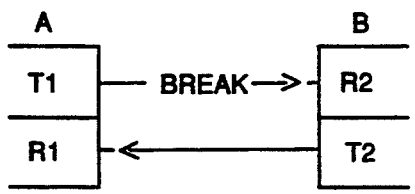
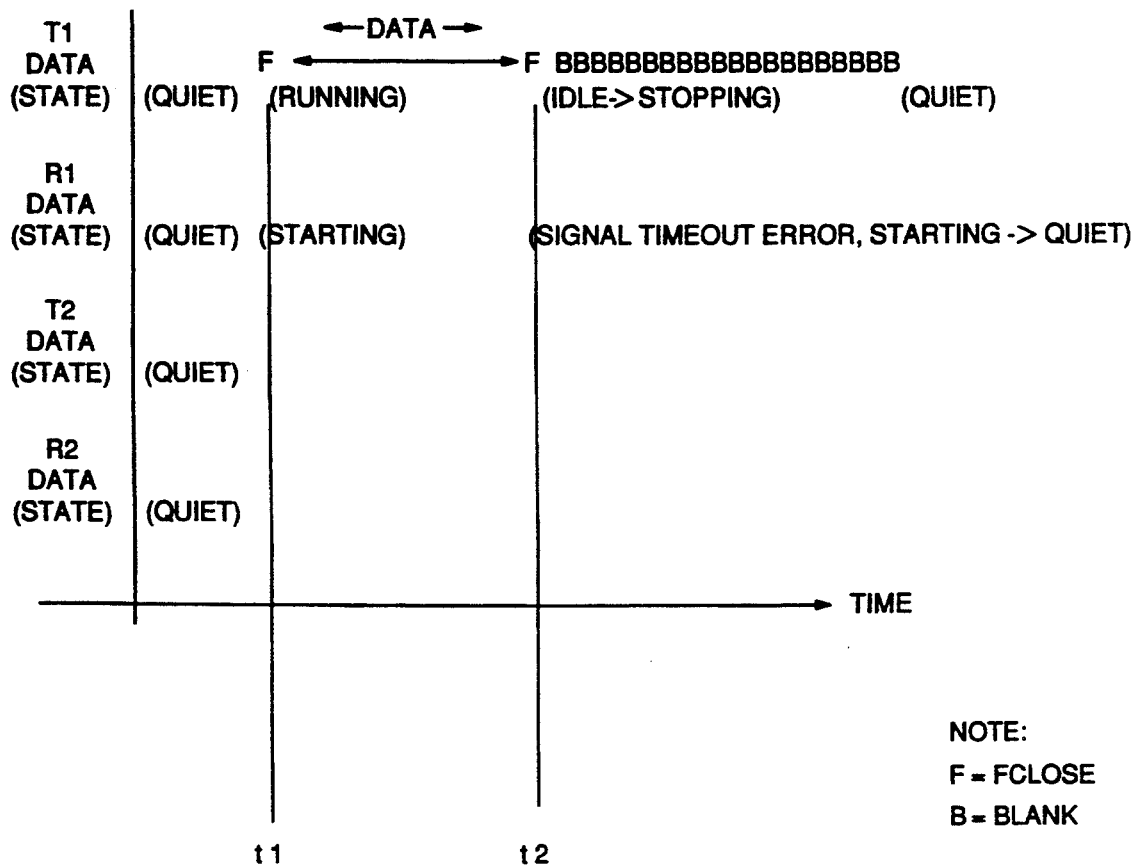
NOTE:
F = FCLOSE
B = BLANK
FIG. 16

EXAMPLE 4: - START WITH COMPLETELY QUIESCED SYSTEM
T1 = QUIET STATE
R1 = QUIET STATE
T2 = QUIET STATE
R2 = QUIET STATE
- MESSAGE BEGINS THROUGH T1
- WIRE BETWEEN T2 AND R1 BROKEN
- SYSTEM THEN QUIESCES AGAIN
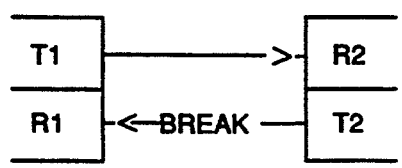
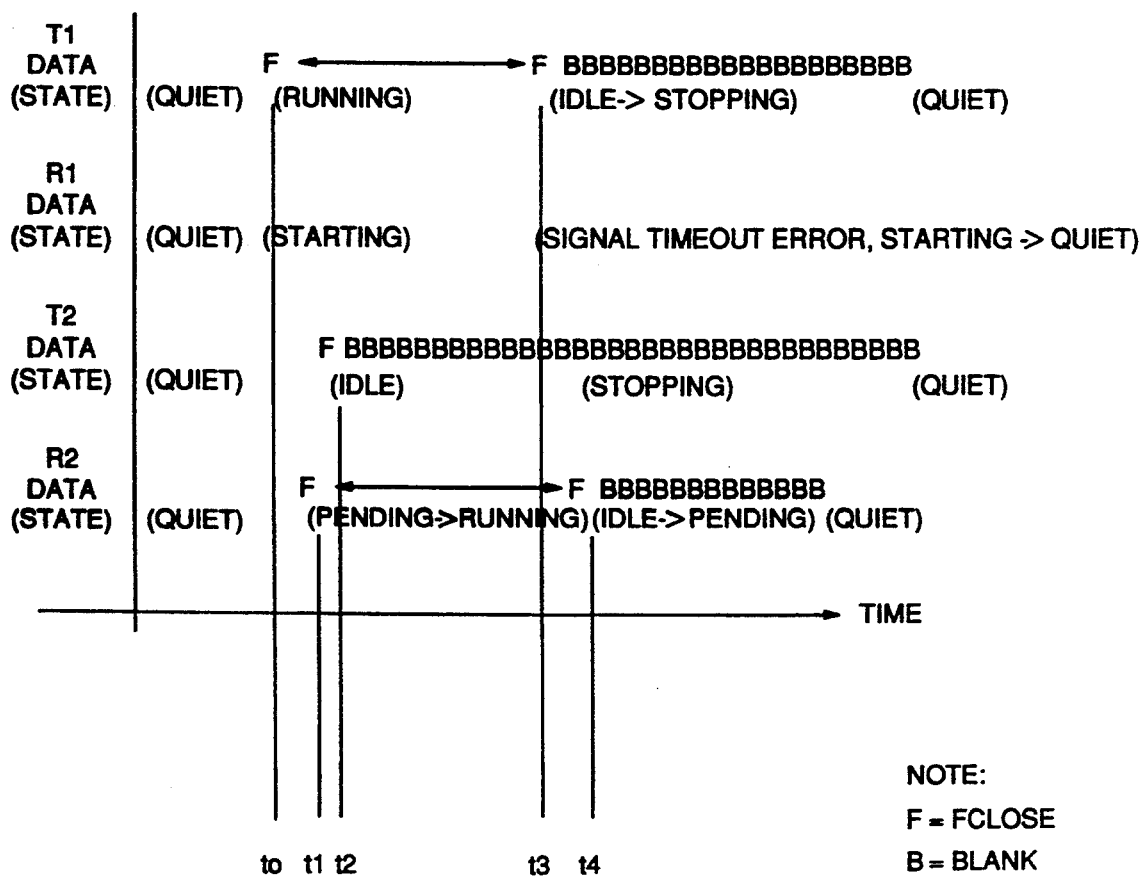
NOTE:
F = FCLOSE
B = BLANK
FIG. 17

EXAMPLE 5: - START WITH SYSTEM ACTIVELY RUNNING
  T1 = RUNNING STATE
  R1 = RUNNING STATE
  T2 = RUNNING STATE
  R2 = RUNNING STATE
 - MESSAGE ENDS THROUGH T1
 - MESSAGE ENDS THROUGH T2
 - JUST AFTER R2 SWITCHES TO QUIET,
   ANOTHER MESSAGE BEGINS THROUGH T1
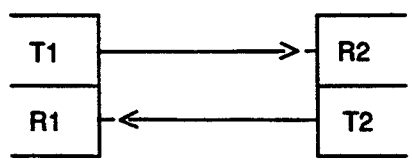
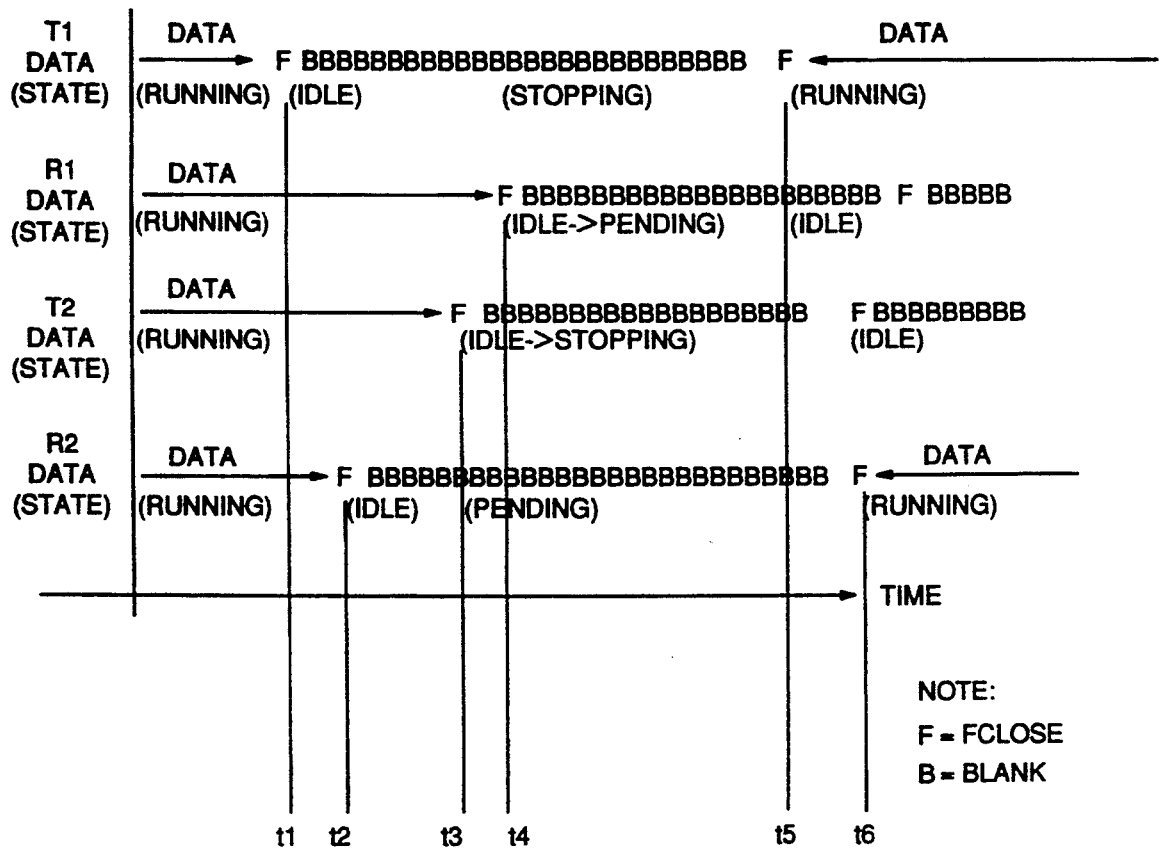
NOTE:
F = FCLOSE
B = BLANK
FIG. 18

POWER-SAVING FULL DUPLEX NODAL COMMUNICATIONS SYSTEMS

FIELD OF THE INVENTION

This invention relates to a communications system that provides full duplex communications between computer nodes, and more particularly, to such a communications system wherein data links are quiesced to a non-current flow state in the absence of message traffic.

BACKGROUND OF THE INVENTION

Traditionally, a communication link between computer systems is enabled and synchronized after the link is brought on-line. Current is run over the link at all times, leaving the lines up, running, synchronized and prepared to receive data at any time. Consequently, a receiver at one end of such a communication link never listens to a quiesced line (one over which no current flows). Broken wires in such system are detected by determining when a signal fails to reach its destination. By necessity, such a communications network consumes substantial power at all times, even when no messages are flowing.

In the environment of highly parallel computing systems where the computing function is distributed among a number of interconnected nodes, significant levels of power dissipation result from constantly-running communication lines. However, quiescing of lines between such nodes to conserve power is not a straight forward matter. Each node generally operates asynchronously and may have message traffic proceeding through it, simultaneously, in both forward and reverse directions. Each node, in such a system is a "master" node and is capable of initiating a message at substantially any time, irrespective of what other nodes are doing at such time. If links between nodes in such a system are quiesced, a procedure and system must be provided that enables any node to fully comprehend what its connected nodes are doing, and whether the communication links connecting the nodes are in proper operating order.

One part of a message protocol problem that needs to be addressed is that communicating devices must be able to recognize whether or not there is message activity. Commercial systems are available that can sense activity on a line. These devices are called transition detectors and their function is to notice a change in line voltage. They detect when a signal changes from low to high and from high to low. It is assumed that there is no active message traffic when a change to low is detected and the signal stays low for a period of time. Such transition detectors are not completely reliable. They can miss a first quiet period after a line has been quiesced. In addition, they can possibly interpret line noise, that occurs as a result of signals induced on a line during the quiesced period, as valid data. Furthermore, transition detectors are unable to detect broken wires or other physical interruptions in the communications network.

Systems for detection of broken wires generally run test patterns over communication links when they are idle. Thus, if a communication link fails after being tested but before it is used, the error condition will go undetected until message traffic is attempted.

When a full-duplex line is quiesced, a problem occurs when resynchronizing the line after power restoration. Both ends of a serial line must be in agreement before message traffic can be transmitted and properly interpreted. A transmitter must have a means for informing a receiver at the other end of the link that the transmitter is ready to send messages. One solution suggested in the prior art is to send an external signal from the transmitter to the receiver, which signal wakes up the receiver so that it can start receiving messages. This solution, requires additional wires to carry the signal and adds cost to the system.

The prior art teaches a number of communication systems that employ power-saving techniques. U.S. Pat. No. 4,484,028 to Kelley et al. describes a private automatic branch exchange wherein receivers automatically power-up and resynchronize upon receiving a burst of data. The system employs a polling technique to keep the links active and powers down after two non-responses to a poll. The system contemplates a master-slave relationship wherein the master's operation prevails.

In U.S. Pat. No. 4,259,594 to Fox et al., a transmission system is described which is powered-up when a message is to be transmitted and then powered down, subsequently. There is no consideration in this patent of nodal synchronization or the problems attendant thereto in a quiesced system.

U.S. Pat. No. 4,654,656 to Deaver et al. teaches a communication network wherein devices are capable of being manually switched to an off-line condition. A message is transmitted to the network indicating that the off-line device may, for some period of time, fail to respond to polls.

U.S. Pat. No. 4,656,318 to Noyes describes a modem with power-off ring detection. When a ring occurs, the circuit obtains power and informs the host computer to power-up the modem and to begin receiving an incoming message.

U.S. Pat. Nos. 4,754,273 and 4,812,839, both to Okada et al., describe a two-wire, time-division communication system used for digital subscriber transmission. Two wires are used to connect the subscribers and enable alternate transmission and reception of digital signals in a burst ("ping-pong") manner. Okada et al. consider transmission of one message over two wires and do not consider the situation where unrelated, asynchronous messages appear on the two lines. Okada et al. also describe a detailed technique for resynchronizing the data links and indicate that any combination of a network controller and/or subscriber can activate or deactivate a link.

U.S. Pat. Nos. 4,663,539 to Sharp et al., 4,435,761 to Kimoto, and U.S. Pat. No. 4,970,506 to Sakaida et al. all describe master/slave communication system wherein the master determines when to start and stop communications. In the '539 patent to Sharp et al., the receiver and transmitters are never shut off. In the '761 patent to Kimoto, the master quiesces and reenables a communication link, whereas in the '506 patent to Sakaida et al., either the master or the slave can power up the system. U.S. Pat. No. 4,592,051 to Frizlen describes how to un-quiesce a line which has a bias current flowing therein (it is not entirely Idle). Activation is carried out through the use of binary code signals to control the system's operation.

Accordingly, it is an object of this invention to provide an inter-nodal communication system wherein a connecting communication link only carries current when there is message activity on the link.

It is another object of this invention to provide an inter-nodal communication system wherein links are resynchronized when a message starts in either direction, and wherein additional wires are not employed for such synchronizing activity.

It is still another object of this invention to provide an inter-nodal communication system wherein broken wires, in either direction, are detected before a message completes.

It is yet another object of this invention to provide an inter-nodal communication system wherein receivers are prevented from listening to line noise caused during a period when a transmitter is quiesced—thereby preventing noise from being interpreted as valid data.

It is still another object of this invention to provide an inter-nodal communication system wherein communications do not depend upon the timing of messages, and nodes may operate in an asynchronous manner.

SUMMARY OF THE INVENTION

An inter-nodal communication system is described wherein full duplex transmission links connect asynchronously operating nodes. Links between nodes are quiesced to a no-current flow state in the absence of message traffic. The method employed by the communication protocol incorporates time-outs which (1) enable a broken link to be detected at the inception of a message and (2) prevent a receiver from listening to a link which has been quiesced by a transmitter at the other end of the link shutting-off. All synchronization messages in the inter-nodal communication network are carried by data 1 inks and no additional communicating wires are required.

DESCRIPTION OF THE DRAWINGS

FIG. 1 is a high level block diagram showing a pair of nodes and a full duplex communication link connecting them.

FIG. 2 is a state table illustrating transmitter states under specified conditions in the inter-nodal communications network.

FIG. 3 is a state table showing receiver states under specified conditions in the inter-nodal communications network.

FIG. 4 is a block diagram of the inter-nodal communications network showing time delays inherent therein.

FIG. 9 is a flow diagram illustrating receiver actions in a Quiet state.

FIG. 10 is a flow diagram illustrating receiver actions in a Starting state.

FIG. 12 is a flow diagram illustrating receiver actions in an Idle state.

FIG. 13 is a flow diagram illustrating receiver actions in a Running state.

FIGS. 14–18 are time-line diagrams showing changes of states of nodal transmitters and receivers in response to exemplary message sequences.

DETAILED DESCRIPTION OF THE INVENTION

Figure 5:
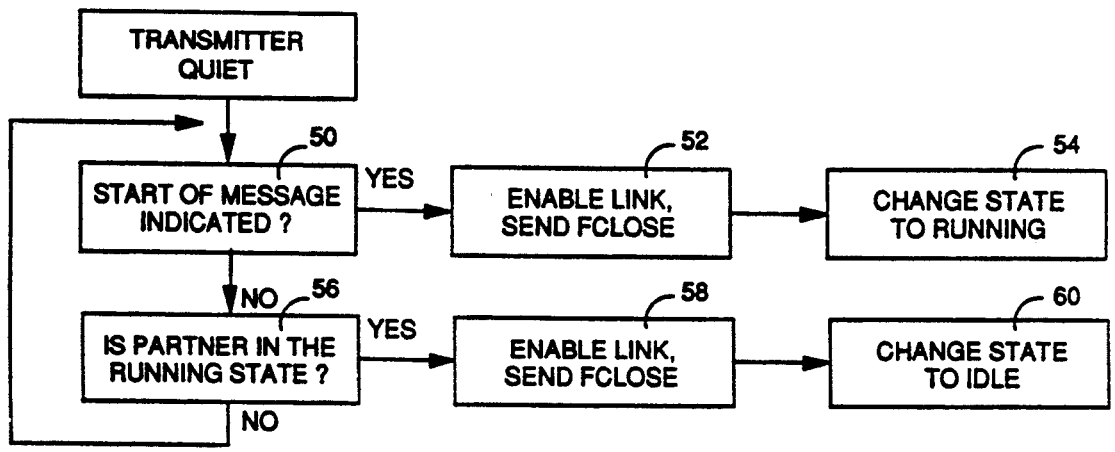
FIG. 5 is a flow diagram illustrating transmitter actions in a Quiet state.
Figure 6:
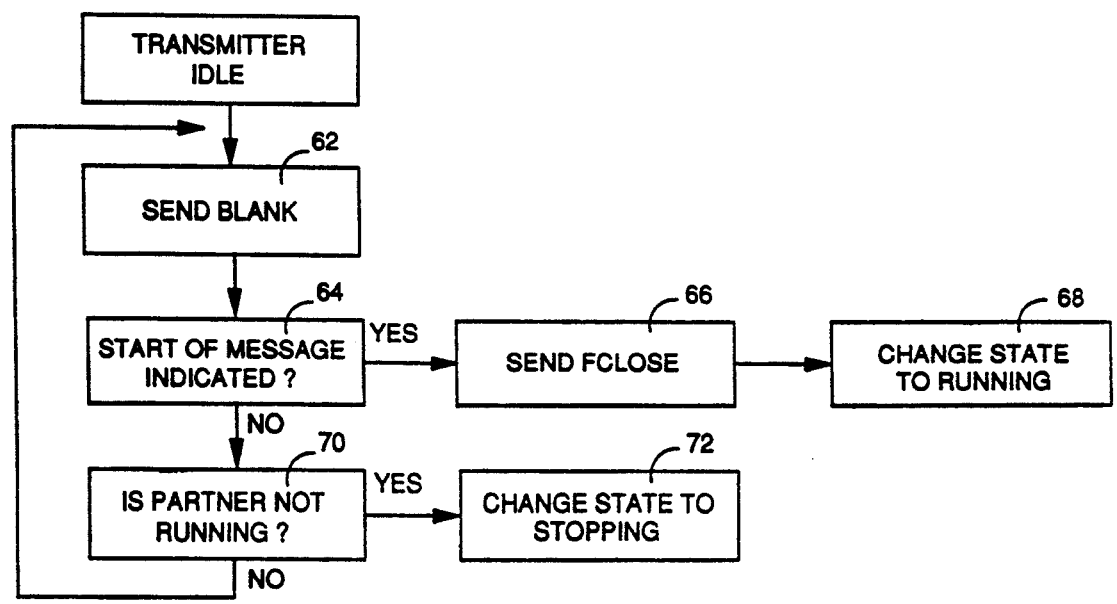
FIG. 6 is a flow diagram illustrating transmitter actions in an Idle state.

In FIG. 1, a nodal communication system comprises a plurality of connected nodes, each node being essentially identical to other nodes. Nodes A and B communicate by sending messages through a full duplex connection, called a link. The link is implemented as a pair of serial lines 10 and 12 that enable independent messages to simultaneously flow in both forward and reverse directions between nodes A and B.

Node A comprises a serial link transmitter 14 whose state is controlled by a transmitter state machine 16. Input messages to node A are received at transmitter state machine 16 which, in response to the present conditions of transmitter 14 and receiver state machine 18 (within node A), controls the status of transmitter 14. Receiver state machine 18 also controls the state of serial link receiver 20, and in doing so considers the state of transmitter state machine 16. Receiver state machine 18 also provides output messages on line 21 that are received from node B.

Node B contains receiver state machine 22, transmitter state machine 24, serial link receiver 26 and serial link transmitter 28, all of which are identical to the respective state machines receivers and transmitters shown in node A. Serial link receiver 26 and serial link transmitter 28 are controlled by their respective state machines 22 and 24. Lines 10 and 12 which comprise the link between nodes A and B are used for forward and reverse communications, respectively. Forward communication will hereafter be used in reference to the direction of a message's transmission from one node to another, and reverse communications will be used with reference to control signals transmitted in a reverse direction to the message transmission direction.

Hereafter, the terms "partner" and "mate" will be employed to refer to relationships between transmitters and receivers. The partner of a transmitter is the receiver in the same node. The partner of a receiver, is, likewise, the transmitter in the same node. The term "mate" (or "mating") refers to the relationship between a receiver and a transmitter in different nodes that are connected by a link line. Thus, the mate to serial link transmitter 14 is serial link receiver 26, whereas the partner of serial link transmitter 14 is serial link receiver 20.

As will become hereafter apparent, both ends of a serial line (e.g. 10) as well as both directions over a link must always be in agreement to assure successful message transmission. Nodes, connected by a link, must have clean transitions between various transmitter and receiver states to avoid communication errors, must detect broken wires, and must prevent a receiver from being confused by line noise when a line is quiesced.

The system shown in FIG. 1 allows a link to be shut off when there is no message traffic and powered up when a message or messages need to be sent. Messages are not delayed during resynchronization and, as a result, are sent in an optimistic mode, assuming the message will be properly received. More specifically, a transmitter does not await for a reply to a synchronizing signal before it transmits a message. Lines are assumed to be functioning correctly and message flow continues as resynchronization occurs.

Each node, as above indicated, includes two state machines, one for a transmitter and one for a receiver. Each state machine has one or more timeout counters to aid in the synchronization of messages and control of link operation. Each transmitter state machine includes a Stopping counter 30 which provides a timeout to enable a transmitter state machine to control its associated transmitter to continue transmission of blank signals for a period in excess of the time required for its mating receiver to proceed to a Quiet (quiescent) state—thereby preventing the mating receiver from listening to a quiesced line.

Each receiver state machine performs a pair of timeout functions, one called Pending timeout and the other termed Starting timeout. Those timeouts are provided by Pending and Starting counters 32 that are part of each receiver state machine. The Starting timeout is a receiver time delay during which, a received synchronizing signal from a mating transmitter is assumed to be the result of the receiver's partner having commenced transmission of a message. This enables the continuity of a link to be determined at the outset of a message transmission.

A Pending timeout is created by a Pending counter 32 and sets a maximum time for a receiver to wait between a synchronizing signal and the first byte of a message. If a message is not received within the Pending timeout, the controlled receiver switches to a new state. Each of these delay functions and states will be further described below.

To achieve resynchronization of a serial line, a transmitter sends standard characters to its mating receiver that establish bit and byte resynchronization and enable recovery of the clock. These characters are not seen by the receiver state machine. The number of resynchronization characters and sequence thereof needed to synchronize the link are not directly relevant to this invention and will not be referred to hereinafter.

A further synch signal (hereafter called FCLOSE) is the first series of characters a receiver state machine recognizes after a serial line is resynchronized. The function of FCLOSE is to set a receiver state machine to a state where it controls its associated receiver to prepare to read a message. The FCLOSE signal is used to wake up a receiver and is also used to indicate the end of a message, thus serving a dual purpose of preparing the receiver to read a new message and to indicate a message's end. The FCLOSE sequence of characters must be chosen so that the serial link receiver will have a low probability of misinterpreting line noise as the FCLOSE sequence.

Each transmitter has four states, i.e., Quiet, Idle, Stopping and Running. Each of these states is shown in FIG. 2 along the horizontal axis of the indicated table. Along the table's vertical axis are listed a plurality of nodal conditions. The intersecting boxes indicate what happens to a transmitter upon the coincidence of the indicated condition and a particular state. The bottommost line of the table indicates the default state of a transmitter. A blank intersection box indicates a default condition. A legend describing the various terms in FIG. 2 is positioned below the table.

A transmitter is initially set to the Quiet state. The transmitter's serial output line carries no current during the Quiet stage and the line is said to be quiesced. A transmitter's Idle state keeps its output line "up" when the opposite direction line has message activity. The Stopping state keeps the output line active by the transmission of "blanks" for a period of time before quiescing the line. Messages are sent from the transmitter when the transmitter is in the Running state.

In FIG. 3, receiver states are shown along the horizontal axis of the table. The receiver states are Quiet, Starting, Pending, Idle and Running. As with FIG. 2, the chart's vertical axis indicates nodal conditions and the intersecting boxes show what happens to a receiver upon coincidence of a state and a listed nodal condition.

A receiver does not listen to its serial line during the Quiet state. However, a receiver, even in the Quiet state will recognize an FCLOSE signal. Starting and Pending states are transitory and enable traversal from one receiver state to another receiver state. The Idle state keeps the receiver listening to its input line when there is message activity in the opposite direction. A receiver is capable of receiving data during the Running state. When there is no message traffic, a receiver is set to the Quiet state. The state diagrams shown in FIGS. 2 and 3 will be hereafter useful in understanding the various transitions which occur in the system of FIG. 1.

As above indicated, each transmitter state machine employs a Stopping timeout and each receiver state machine employs a Pending timeout and a Starting timeout. Turning now to FIG. 4, additional detail will be provided regarding those timeouts. The Starting timeout enables detection of broken wires by a receiver recognizing that an FCLOSE signal has not been received within the Starting timeout. The Stopping timeout and Pending timeout both prevent a transmitter from quiescing while its mate is still listening to a line. Additionally, the Pending timeout allows ample time for a message to start across a link. In FIG. 4, amounts of time are illustrated that are required for data bytes or state information to travel between transmitters and receivers. T1 and T3 are delays built into the link hardware and represent the amount of time required to send and receive messages between mates. T2 and T4 are delays built into the receiver and transmitter modules, respectively, and represent the amount of time for partners to communicate.

As indicated above, a transmitter will commence a message with the transmission of an FCLOSE signal. Subsequent to the transmission of the FCLOSE signal, a transmitter will transmit blank signals until a message header appears. A receiver employs the Pending timeout to set the maximum number of blank characters it listens to between an FCLOSE and the first byte of a message header. This amount of time is considered long enough for a reasonable delay between an FCLOSE and a start of data; however, it is sufficiently short so that the transmitter does not quiesce a line while its mate is still listening. As will hereafter be understood, this implies that a transmitter must terminate its transmissions prior to the expiry of the Pending timeout—and this function is handled by the transmitter's Stopping timeout, to be described below. If the Pending timeout is exceeded and there is no activity on the line, the receiver enters the Quiet state to avoid listening to line noise.

The Pending timeout is expressed as:

Pending timeout=P

The Starting timeout is a receiver timeout and is the maximum amount of time a receiver waits for a link to initialize. The Starting timeout is greater than or equal to the amount of time required for an FCLOSE starting a message to travel from a transmitter to a mating receiver and to return to the transmitter's partner receiver in the originating node. This round trip delay detects broken wires. The Starting timeout may be expressed as:

Starting timeout $\geq (T1+T2+T3-T4)$

A receiver begins counting after it is informed that its transmitter partner is sending characters. It counts until it receives an FCLOSE signal indicating that its transmitter mate (at another node) has initialized their serial line; or until its transmitter partner switches out of the Running state, indicating that there is no message activity. If the link is not started within an amount of time equal to Starting timeout and the receiver's partner transmitter remains in a Running state, the receiver notifies its partner that a link error has occurred.

As above indicated, Stopping timeout is a transmitter timeout and is the number of blank characters a transmitter sends after an FCLOSE and before quiescing its output line. The value of the Stopping timeout must be greater than the value of the Pending timeout to prevent a receiver from continuing to listen to a line (in the Pending state) after the transmitter has quiesced the line. In addition, the value chosen for Stopping timeout must be sufficiently large to prevent a transmitter from quiescing a serial line when its mate learns that there is message activity in the opposite direction. The Stopping timeout is expressed as:

Stopping timeout $\geq (T1+T2+T3-T4)+P$

Referring now to FIGS. 5-8, the transmitter states Quiet, Idle, Stopping and Running will be described.

QUIET

In this state (see FIG. 5), a transmitter is quiesced (transmitting nothing) and there are no active messages through it or its partner. A transmitter remains in the Quiet state until a message is started or its partner enters a Running state. If the transmitter sees the start of a message (box 50), it initially enables the link (box 52) by transmitting synchronization characters over its output line and then follows those characters with an FCLOSE synch character to wake up its receiver mate. It then changes state to Running in preparation to transmit the message. If, by contrast, the transmitter does not see the start of a message, but the transmitters partner switches to the Running state (box 56), the transmitter realizes that its partner receiver may be receiving a message and that it may be required to transmit reverse direction control messages. In this condition, the transmitter enables its link (box 58) as aforesaid and sends an FCLOSE synch signal. It then enters an Idle state (box 50), transmits blanks, and awaits further instructions. By referring back to FIG. 2, the state changes shown in FIG. 5 can be seen in the leftmost column of the chart and indicate in a shorthand manner, the actions of a transmitter in the Quiet state in response to either a start of message or the sensing that a partner receiver is switching to the Running state.

IDLE

A transmitter is in this state (FIG. 6) when the transmitter's partner is in the Running state. In the Idle state, however, the transmitter is not currently sending a message. The Idle state keeps the link enabled, with the transmitter sending blank characters (box 62, FIG. 6) to keep the link enabled. If a start of message is seen by the transmitter (box 64) the transmitter sends at least one FCLOSE synch character so that its receiver mate can prepare to receive the message. Then the transmitter switches to the Running state (box 68) to send the message. If no start of message is indicated, and the transmitter's receiver partner switches out of the Running state (box 70), the transmitter enters the Stopping state, due to the lack of message activity.

STOPPING

Figure 7:
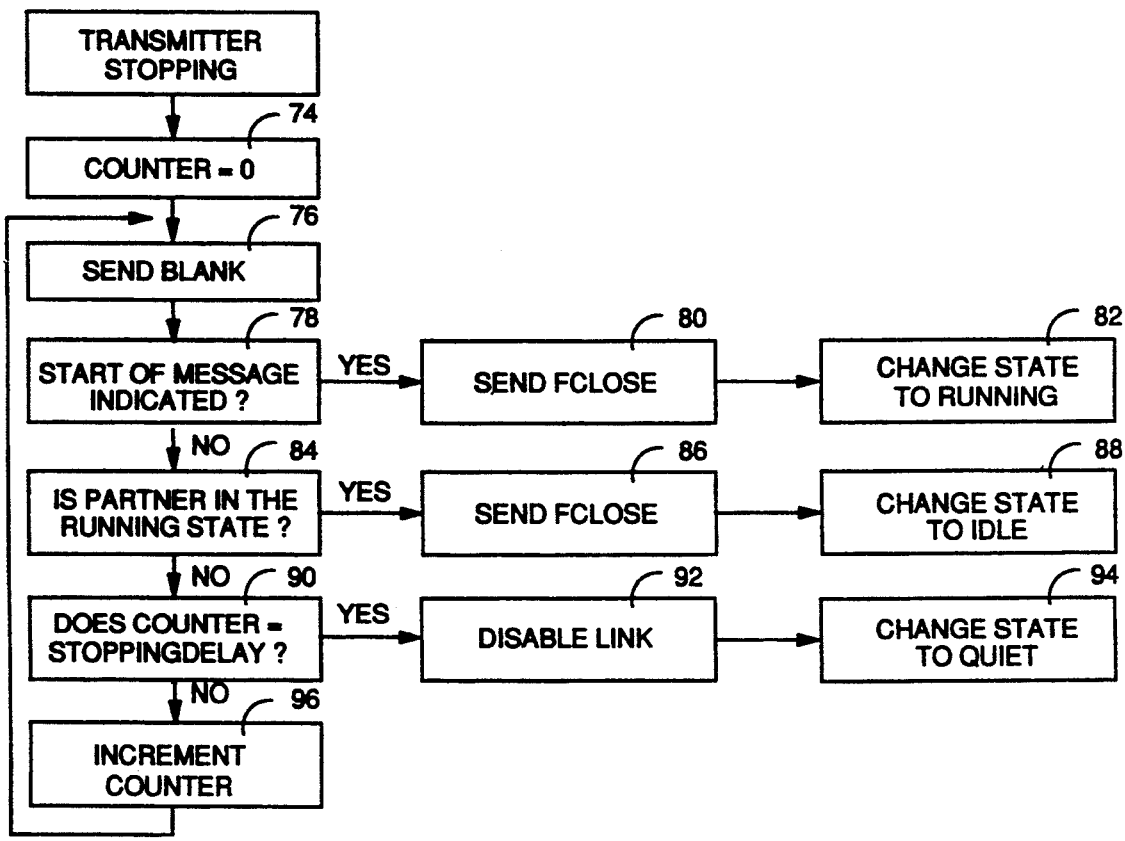
FIG. 7 is a flow diagram illustrating transmitter actions in a Stopping state.
Figure 8:
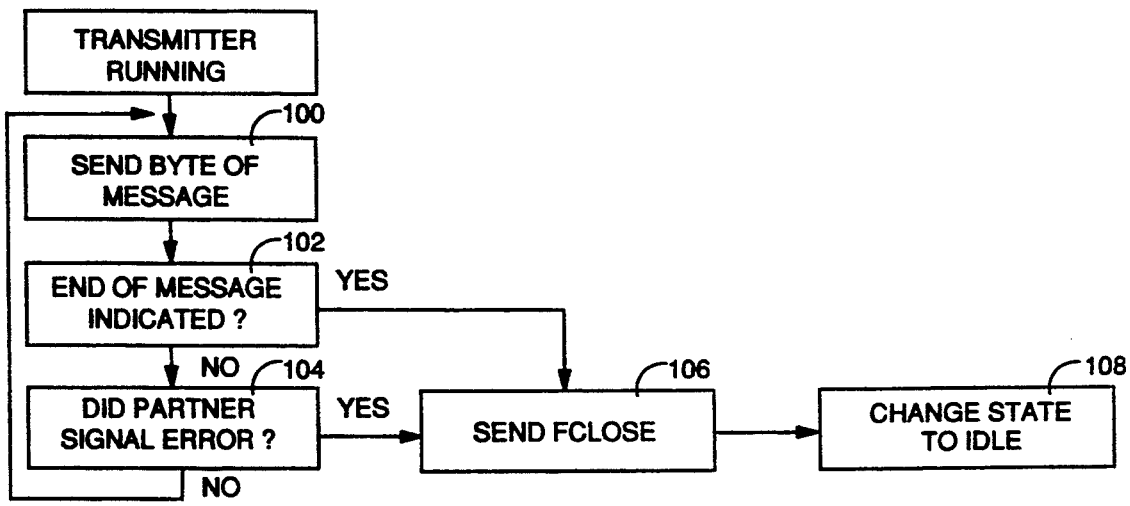
FIG. 8 is a flow diagram illustrating transmitter actions in a Running state.

In this state (FIG. 7), a transmitter is not sending messages and its partner is not receiving messages. However, the link remains active and the transmitter sends blank characters for a period of the time determined by the Stopping timeout. The Stopping state is illustrated in FIG. 7 and is designed to keep the link active for a period of time before quiescing it to the Quiet state, so as to accommodate the case where a message is about to start through the transmitter's receiver partner input line.

In the Stopping state, a transmitter's Stopping timeout counter is reset to zero (box 74) and blanks are transmitted to the transmitter's partner (box 76). If a start of message is seen by the transmitter (box 78), an FCLOSE synch signal (box 80) is transmitted and the transmitter changes its state to Running. If the transmitter does not receive a start of message and its receiver partner is in the Running state (box 84), the transmitter must bring the link up in the opposite direction and prepare to transmit control signals. It accomplishes this change of state by initially sending an FCLOSE synch signal (box 86) and changing state to Idle (box 88), wherein it transmits blanks over its associated output line.

If the transmitter does not see the start of a message, and its receiver partner is not in the Running state, and the Stopping timeout counter times-out (box 90), it is determined that there is no link message activity in either direction. The transmitter then disables its line (box 92) and changes to the Quiet state by removing all current from its output line (box 94). The value of the Stopping timeout is greater than a receiver's Pending timeout. Thus, a receiver will always enter the Quiet state before a transmitter enters the Quiet state, thereby eliminating the possibility of the receiver listening to a quiesced line and misinterpreting line noise as valid data. The Stopping timeout also includes additional time to enable the transmitter to determine if there is message activity emanating from its partner's mate.

If the Stopping timeout counter has not timed-out, the counter is merely incremented (box 96), and the procedure continues by sending blanks, etc.

RUNNING

During a transmitter's Running state (FIG. 8), the link transmits message data, and the transmitter's partner and the partner's mate are both aware that a message is being transmitted. When the transmitter is Running, a message is being transmitted (box 100). When either an end of message is reached (box 102) or the transmitter's partner signals an error (box 104), the transmitter is caused to send an FCLOSE synch signal (box 106) and subsequently changes its state to Idle, where it transmits blanks (box 108). Otherwise, the transmitter continues to send a message (until it receives the end of a message or an error is signalled by its partner).

As above indicated, receiver states are Quiet, Starting, Pending, Idle, and Running. Those states are illustrated in FIGS. 9–13 and will be described below.

QUIET

There is no message traffic on a link during the Quiet state (FIG. 9). A receiver assumes that its transmitter mate is quiesced and ignores any signal other than an FCLOSE synch character. An FCLOSE character informs the receiver that the link is enabled. Any other character is considered to be noise. When an FCLOSE is detected (box 110), the receiver checks to see if its transmitter partner is in the Running state (box 112). If yes, the receiver enters the Idle state (box 114). If no, the receiver switches to the Pending state (box 116). Both Idle and Pending states prepare a receiver to read a message; however, a receiver enters the Pending state in the case where its partner is not Running because Pending provides a transition to the Quiet state. If the receiver's transmitter partner is in the Running state (box 118), the receiver enters the Starting state (box 120) and begins to listen for an FCLOSE synch signal from its transmitter mate. Otherwise, the receiver remains in the Quiet state.

STARTING

This state is shown in FIG. 10 and occurs when the receiver's partner has switched to the Running state, but the receiver's input line is still quiesced. In this state, the receiver waits for its transmitter mate to initialize the receiver's input line. If the line fails to initialize within an amount of time equal to Starting timeout, an error signal is generated. More specifically, the Starting timeout counter is initialized to zero (box 122) and begins to count up to the value of the Starting timeout. During this time, the receiver awaits for an FCLOSE synch signal and upon receiving same, switches to the Idle state (box 126) to await a start of message (box 126). If no FCLOSE synch signal is received, and the receiver's partner switches to a not-Running state (box 128), then the receiver switches to the Quiet state (box 130). All this must occur before the Starting timeout counter times out (box 132).

When the Starting counter does reach the Starting timeout value, it indicates that the receiver's partner has remained in the Running state for a period of time greater than or equal to the Starting timeout. In such case, the receiver signals an error to its partner (box 134) and resets its Starting timeout counter. The receiver's partner transmitter responds by leaving the Running state and allowing the receiver to return to the Quiet state. Otherwise, the receiver remains in the Starting state.

PENDING

In this state (FIG. 11), a receiver has detected an FCLOSE synch signal indicating that the link is active. However, no message is being sent in either direction. The receiver listens to blank characters from its transmitter mate while awaiting for the start of a message. The maximum amount of time the receiver waits in this state the Pending timeout. As indicated above, the Pending timeout is shorter than the Stopping timeout, thereby assuring that the receiver stops listening to a line before its transmitter mate shuts down the line.

Figure 11:
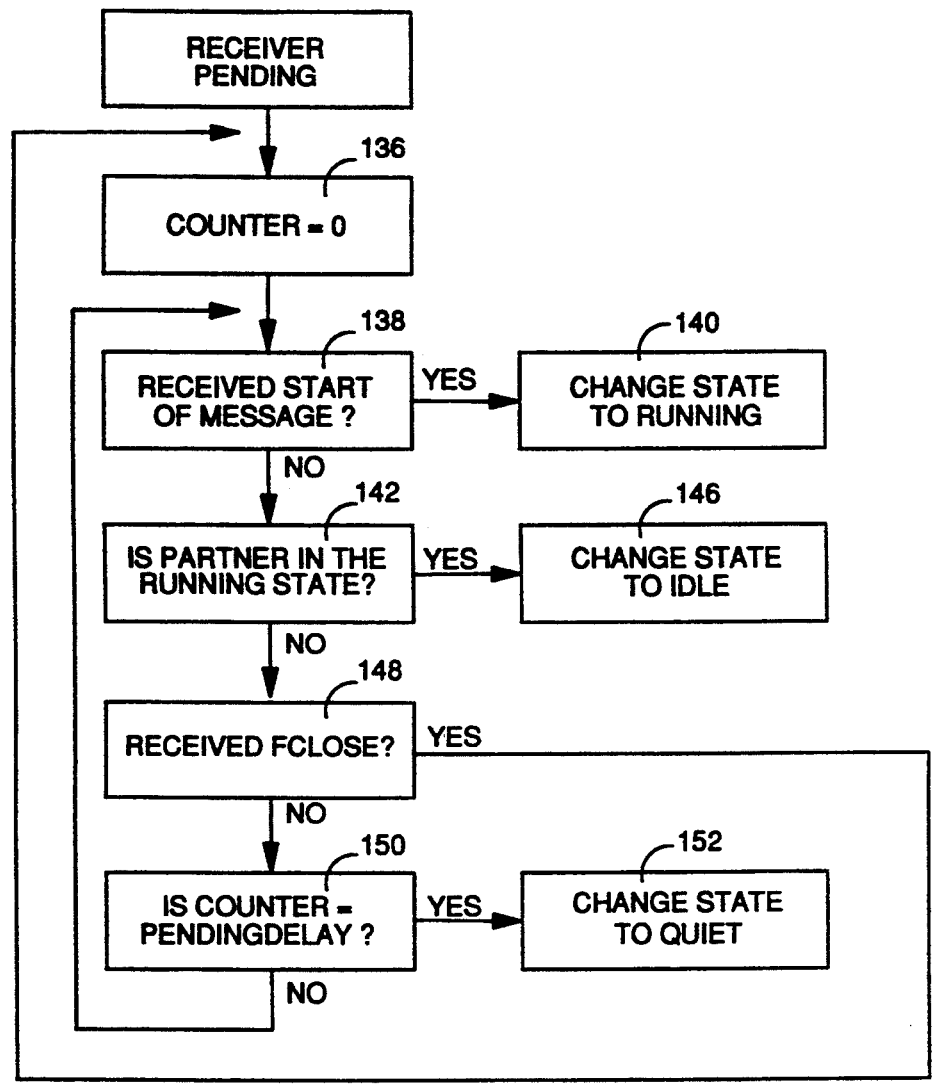
FIG. 11 is a flow diagram illustrating receiver actions in a Pending state.

In FIG. 11, the procedure followed during the Pending state is shown and indicates (box 136) that the Pending timeout counter is set initially to zero and a countdown is commenced. If a start of message is received (box 138), the receiver leaves the Pending state and enters the Running state (box 140). If no message has yet been received and the receiver's partner is in the Running state (box 142), the receiver departs from the Pending state and enters the Idle state (box 146). The receiver enters the Idle state to prepare itself to receive reverse direction control data. If the receiver's partner is not in the Running state, and the receiver detects an FCLOSE synch signal, the receiver resets its Pending timeout counter, to wait for another period equal to the Pending timeout. Thus, the receiver is prepared to receive the message for the period of Pending timeout.

If a timeout occurs in a receiver's Pending timeout counter (box 150), the receiver enters the Quiet state which prevents the receiver from listening to line noise in the event that its mate subsequently leaves the Stopping state and shuts down the link. Otherwise, the receiver remains in the Pending state. With respect to the receiver sensing an FCLOSE synch signal, it is to be remembered that the protocol of this invention requires that an FCLOSE synch signal be appended both at the beginning and at the end of a message. Thus, the Pending Delay also enables a receiver to distinguish between an FCLOSE synch signal that is appended at the beginning of a message and an FCLOSE synch signal that is appended at the end of a message (and is not followed by a start of message).

IDLE

In the Idle state (FIG. 12), the receiver's partner is in the Running state, however, the receiver is not reading a message. The receiver remains in the Idle state until it receives a start of message, at which point it changes its state to Running (box 156). If no start of message is received and the receiver's partner is not Running (box 158), then the receiver changes state to Pending (box 160) in preparation for entering the Quiet state. Otherwise, the receiver remains in the Idle state.

RUNNING

As shown in FIG. 13, Running is an active state wherein a receiver is receiving and handling data (box 162). Once the receiver receives an FCLOSE synch signal (box 164) signalling the end of a message, the receiver changes state to Idle to prepare to receive another message. Otherwise, the receiver continues normal operation until the end of the message.

Turning now to FIGS. 14–18, examples of various inter-nodal communication sequences will be described. In FIG. 14, transmitters T1 and T2 are in the Quiet state as are receivers R1 and R2. At t1, transmitter T1 departs from the Quiet state and enters the Running state by transmitting an FCLOSE synch signal. At t2, the transmitted FCLOSE synch signal is received by receiver R2 which enters the Pending state and commences a Pending timeout. However, because message data is received before the Pending timeout expires, receiver R2 enters the Running state and processes the received data.

At t3, the state machine associated with transmitter T2 senses that receiver R2 has entered the Pending state. As a result, it causes transmitter T2 to depart from the Quiet state and to enter the Idle state and transmit an FCLOSE synch signal back to receiver R1. Transmitter T2 follows the FCLOSE synch signal (during the Idle state) with blank signals to maintain the reverse direction in an enabled state.

At t4, receiver R1 receives the FCLOSE synch signal from transmitter T2. Since that FCLOSE synch signal is received at receiver R1 prior to the timeout of its Starting timeout (which was commenced at the time its partner transmitter T1 transmitted an FCLOSE synch signal), receiver R1 knows that the links between nodes a and b are complete and that message transmission will not be hindered by a broken line.

At t5, transmitter T1 indicates the end of a message by transmitting an FCLOSE synch signal and switching from the Idle into the Stopping state. At such time, a Stopping timeout begins in transmitter T1. The transmitted FCLOSE synch signal is received at receiver R2 at t6 and causes receiver R2 to briefly enter the Idle state. It is in the Idle state for only one clock cycle, as its partner transmitter T2 is not Running. Thus, receiver R2 immediately proceeds to the Pending state and commences a Pending timeout. Since the Pending timeout is shorter than the Stopping timeout, receiver R2 transitions to the Quiet state prior to transmitter T1 entering the Quiet state, thus preventing receiver R2 from listening to a quiesced line. When receiver R2 switches to the Idle state at t6, transmitter T2 enters the Stopping state and commences a Stopping timeout. When transmitter T1 switches to the Idle state at t5, receiver R1 switches to the Pending state and commences a Pending timeout. This last sequence quiesces the line between transmitter T2 and receiver R1.

Figure 15:
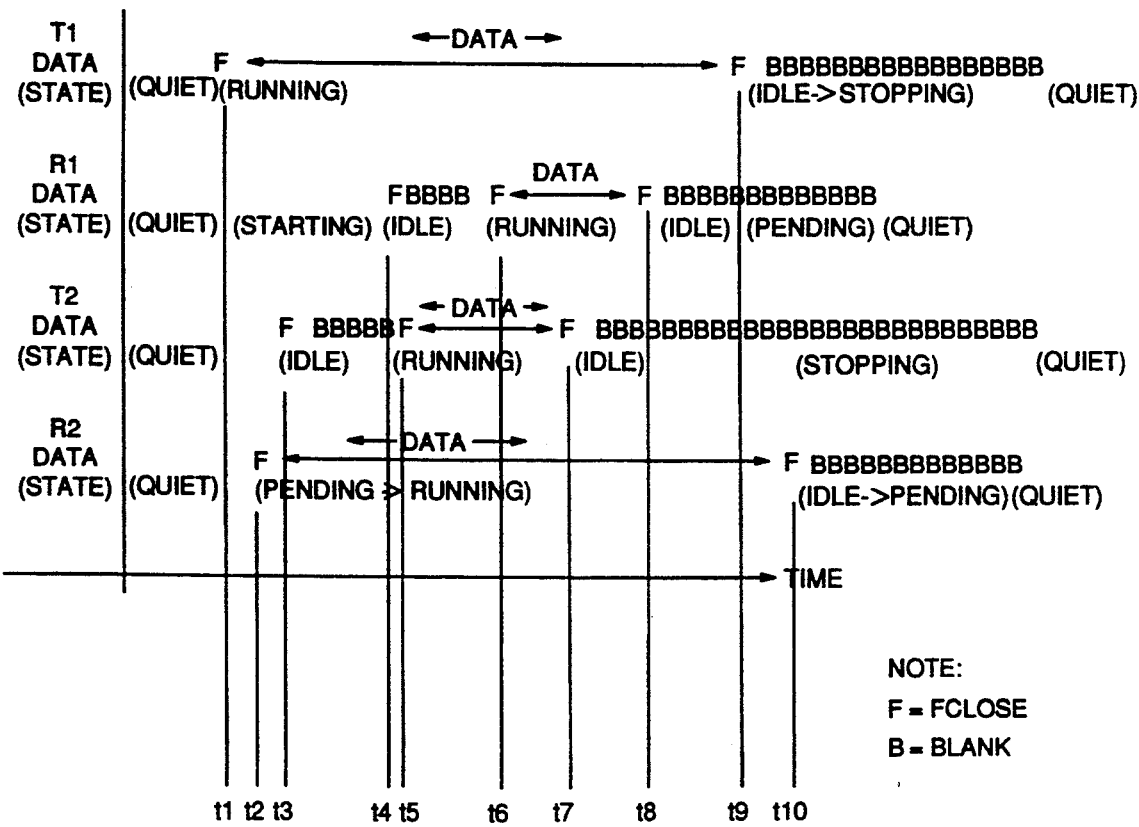

Turning now to FIG. 15, the affect of a reverse direction message will be illustrated. The actions at t1-t4 are the same as described for FIG. 14. At t5, the Idle state of transmitter T2 is interrupted by a message destined for R1. Transmitter T2 sends an FCLOSE synch signal to receiver R1, switches from the Idle state to the Running state, and commences transmission of data to receiver R1. The FCLOSE synch signal transmitted at t5 arrives at receiver R1 at t6 and data following it causes receiver R1 to enter the Running state. At t7, an FCLOSE synch signal is generated by transmitter T2 (in response to its reaching an end-of-message). The FCLOSE synch signal from transmitter T2 is received at t8 by receiver R1. At this point, receiver R1 enters the Idle state and remains there because transmitter T1 is still transmitting data. Similarly, transmitter T2 at t7 entered the Idle state and remained there because its partner, receiver R2, was still in the Running state.

At t9, transmitter T1 transmits an FCLOSE synch signal at the end of its message, which FCLOSE is received at receiver R2 at t10. Receiver R2 responds by proceeding to the Idle state and then to the Pending state. When receiver R2 enters the Pending state, transmitter T2 departs from the Idle state and enters the Stopping state, because its partner is no longer Running. Similarly, receiver R1 entered the Pending state shortly after t9 and began its Pending timeout. Since no further message activity occurs, each of the time-outs occurs (with the Pending timeouts occurring before the Stopping timeouts) and the entire link reverts to the Quiet state.

In FIG. 16, an example is shown illustrating the effect of a broken wire. As will be clear, if either line of a link is broken, a message is not started in either the forward or reverse direction. At t1, transmitter T1 transmits an FCLOSE synch signal, enters the Running state and commences data transmission. At the same time, receiver R1 enters the Starting state (from the Quiet state) and commences the Starting timeout. When receiver R1 does not receive an FCLOSE synch signal back from transmitter T2 (as a result of receiver R2 having received the initial FCLOSE signal), it signals a timeout error to transmitter T1 and reverts to the Quiet state. In this manner, a line error is detected and remedial action can be taken.

In FIG. 17, the case is illustrated where a break exists in a line between transmitter T2 and receiver R1. In this case, the actions at t0-t2 are indicative of a properly operating link. However, receiver R1 does not receive an FCLOSE synch signal prior to its Starting timeout. As a result, it signals a timeout error and reverts to the Quiet state. This timeout causes transmitter T1 to abort the message and to send an FCLOSE. However, transmitter T2 is unaware that the link is broken so, after transmitting its FCLOSE synch signal at t2, it enters the Idle state and commences transmitting blanks which are never received at R1 due to the line break. However, receiver R2 receives the transmitted data from transmitter T1 and a terminating FCLOSE synch signal at t4. That FCLOSE synch signal enables the link to again proceed to the quiescent state.

Turning now to FIG. 18, another example is illustrated that indicates why the Stopping state causes a link to stay up for a short period of time after a message ends. In the example shown in FIG. 18, it is assumed that a little after transmitter T1 completes one message and switches to the Stopping state, another message begins through transmitter T1. It will be noted that all transmitters and receivers are initially in the Running state.

At t1, transmitter T1 transmits an FCLOSE synch signal which is received at t2 by receiver R2. Because transmitter T2 is in the Running state, receiver R2 switches to the Idle state and remains there until transmitter T2 finishes its message and transmits an FCLOSE synch signal to receiver R1. At t3, because transmitter T2 exits the Running state, receiver R2 goes to the Pending state and commences a Pending timeout. At t3, transmitter T2 also generates an FCLOSE sync signal which is sent to receiver R1. Receiver R1 responds at t4 by briefly entering the Idle state, for one clock cycle and then entering the Pending state (and commencing a Pending timeout). As a result of receiver R1 entering the Pending state, transmitter T1 enters the Stopping state at t4 and commences a Stopping timeout.

Before the Stopping timeout in transmitter T1 expires, a new message is received and transmitter T1 responds at t5 by transmitting an FCLOSE synch signal to receiver R2 and entering a Running state. When transmitter T1 switches to the Running state, receiver R1 switches to the Idle state.

Upon receiving that FCLOSE synch signal, followed by data, receiver R2 enters the Running state at t6. When receiver R2 enters the Running state, transmitter T2 leaves the Stopping state, transmits an FCLOSE synch signal, and enters the Idle state.

Note that immediately after t5, receiver R1 is in the Idle state and transmitter T2 is in the Stopping state. Because the Stopping delay is set long enough to allow the start of the message in transmitter T1 to affect the state of transmitter T2, transmitter T2 is prevented from switching to the Quiet state from the Stopping state between t5 and t6. Because transmitter T2 is prevented from switching to the Quiet state from the Stopping state, receiver R1 (which is in the Idle state after t5) never listens to a quiesced line (i.e. transmitter T2 in the Quiet state).

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

We claim:

1. A system for enabling communications coordination between first and second nodes, said nodes operating asynchronously and having a full duplex transmission link connected therebetween, each node having transmitting means and receiving means connected by lines of said full duplex transmission link for forward and reverse direction message handling, a receiver means at said first node and a transmitter means at said second node connected via a line termed "mates" and a receiver means and a transmitter means resident in a single node and connected to said full duplex transmission link termed "partners", the system comprising:

means coupled to said transmission link for quiescing a line between mates to a non-current flow state in the absence of message traffic;

means responsive to message traffic for enabling lines comprising said full duplex transmission link whenever a message is to be transmitted, by causing said transmitter means at said first node to transmit to said receiver means at said second node, at least a synch character at both a start and an end of a message, said transmitter means at said first node continuing for a period after a synch character at the end of said message to generate blank signals; and stopping means at said second node responsive to said synch character at the end of said message received from said transmitter means at said first node for controlling said receiver means at said second node to cease detecting signals after a pending time out which commences substantially upon receipt of said synch character, said pending time out set to expire before said transmitter means at said first node ceases transmission of said blank signals.

2. The system as recited in claim 1 further comprising:

means responsive to said received synch character at the end of said message for enabling said receiver means at said second node to enter a quiescent state after receipt of said synch character at the end of said message from said transmitter means at said first node and before said pending time out expires, unless data is received from said transmitter means at said first node within said pending time out.

3. The system as recited in claim 1, further comprising:

means responsive to a message start to cause synch characters to be transmitted by transmitter means in said first and second nodes in both forward and reverse directions over lines comprising said full duplex transmission link to test for broken lines in said full duplex transmission link.

4. A method for enabling communications coordination between first and second nodes, said nodes operating asynchronously and having a full duplex transmission link connected therebetween, each node having transmitting means and receiving means connected to said full duplex transmission link for forward and reverse direction message handling, receiver means and transmitter means connected over a line of said link termed "mates" and receiver means and transmitter means resident in a single node and connected to said full duplex transmission link termed "partners", the method comprising the steps of:

a. quiescing a line between mates to a non-current flow state in the absence of message traffic;

b. enabling a transmitter means at said first node to activate its connected line and to transmit to a receiver means mate at said second node, synch characters at both a start and end of a message;

c. activating in said first node, a Starting timeout when said transmitter means at said first node commences Running and transmits a synch character; and d. operating said receiver means mate in said second node to respond to data following a received synch character from said transmitter means in said first node, by entering a Running state, entry into said Running state causing a transmitter means partner in said second node to activate its connected line and to transmit a synch character to a receiver means mate in said first node, continuity of said full duplex transmission link in forward and reverse directions being assured by receipt of a synch character by said receiver means mate in said first node prior to the expiry of said Starting timeout.

5. The method as recited in claim 4 wherein said receiving means mate in said second node responds to a synch character at the end of a message by entering a Pending state wherein a Pending timeout is commenced, said method comprising the further step of:

causing said transmitter means in said first node to enter a Stopping state subsequent to transmission of the synch character at the end of the message, said Stopping state causing commencement of a Stopping timeout which is longer in duration than said Pending timeout, said receiver means mate at said second node, at the expiry of said Pending timeout, entering a quiescent state and said transmitter means at said first node entering a quiescent state subsequent thereto due to the longer duration of said Stopping timeout.

6. The method as recited in claim 5 wherein said transmitter means in said first node, upon entering said Stopping state, sends blank signals to its receiving means mate, said receiving means mate receiving said blank signals and terminating its reception while said blank signals are continuing to be transmitted due to expiry of said Pending timeout prior to expiry of said Stopping timeout.

7. The method as recited in claim 6 wherein the duration of said Stopping timeout is greater than or equal to the time required for a round trip of a signal over lines connecting said first and second nodes plus the maximum amount of time a receiver means mate to said transmitter means in said first node can spend in the Pending state.

8. A method for enabling communications coordination between first and second nodes that operate asynchronously and have a full duplex transmission link connecting them, each node having transmitting and receiving means for forward and reverse direction message handling, a receiver means and a transmitter means connected between nodes via a line termed "mates" and a receiver means and a transmitter means resident in a single node termed "partners" each transmitter means transmitting a synch character at both ends of a message, the method comprising the steps of:

enabling a transmitter means in said first node to transmit a synch character to a receiver means mate in said second node, said transmitter means in said first node then entering a Stopping state and subsequently transmitting blanks during a Stopping timeout; and causing said receiver means in said second node to respond to said synch character from said transmitter means in said first node, when a transmitting means partner of said receiver means at said second node is not in a Running state, by switching to a Pending state to commence a Pending timeout and to subsequently switch to a Quiet state wherein all signals are ignored except for a synch character, said receiver means in said second node switching to said Quiet state only if a message is not received prior to said Pending timeout, said Pending timeout exhibiting a lesser duration than said Stopping timeout.

9. The method as recited in claim 8 wherein said receiver means in said second node responds to said transmitter means partner entry into a Running state during said Pending timeout and prior to receipt of a message, by entering an Idle state to await receipt of further signals from its transmitter means mate.

10. The method as recited in claim 9 wherein said receiver means mate in said second node responds to a second received synch character prior to said Pending timeout to reset said pending timeout and cause it to restart.

11. The method as recited in claim 10 wherein said receiver means in said second node responds to a message received prior to said Pending timeout, by causing said transmitter means partner to enter a Running state and to transmit a synch character to a receiver means mate in said first node.

12. A method for enabling communications coordination between first and second nodes that operate asynchronously and have a full duplex transmission link connecting them, each node having transmitting and receiving means for forward and reverse direction message handling, respectively, a receiver means and a transmitter means connected between nodes via a line termed "mates" and a receiver means and a transmitter means resident in a single node termed "partners" each transmitter means transmitting a synch character at both ends of a message, the method comprising the steps of:

enabling a transmitter means in a first node to transmit a synch character to a receiver means mate in a second node, said transmitter means in said first node then entering a Stopping state and subsequently transmitting blanks during a Stopping timeout;

causing said receiver means mate in said second node to respond to said transmitted synch character when its transmitting means partner is in a Running state, by switching to an Idle operational state until said Running state terminates or until a message is received, whichever occurs first;

enabling said receiver means mate in said second node to respond to a message if said synch character precedes said message or to respond to a control signal that occurs as a result of the operation of said transmitter means partner, said receiver means mate in said second node further responding to its transmitter means partner's entry into a non-Running state by entering a Pending state and commencing a Pending timeout.

* * * * *